United States Patent Office 3,788,910
Patented Jan. 29, 1974

3,788,910
EXTRACTION AND PURIFICATION OF
MALTOTRIOSE AND MALTOTETROSE
Graham G. Stewart and Allan E. Earl, London, Ontario,
Canada, assignors to Labatt Breweries of Canada Limited, London, Ontario, Canada
No Drawing. Filed Jan. 17, 1972, Ser. No. 218,478
Int. Cl. C12b 1/00
U.S. Cl. 195—11                                        6 Claims

ABSTRACT OF THE DISCLOSURE

Maltotriose and maltotetrose are extracted from a fermentable source material, conveniently a brewer's wort, and purified in a commercially advantageous manner by fermenting the material with *Saccharomyces uvarum* to remove lower molecular weight sugars, separating the yeast from the remaining liquid and subjecting the liquid containing maltotriose and maltotetrose to gel filtration chromatography and collecting samples containing maltotriose and/or maltotetrose. The collected fractions containing the desired maltotriose and/or maltotetrose can be subjected to further purification by means of charcoal column chromatography.

BACKGROUND OF THE INVENTION

This invention relates to the extraction and purification of maltotriose and maltotetrose from a fermentable source material in which they are present.

Both maltotriose and maltotetrose are sugars. Thus, maltotriose is an amylosaccharide having three glucose units (glucose-1,4-glucose-1,4-glucose) and maltotetrose is an amylosaccharide having four glucose units (glucose-1,4-glucose-1,4-glucose-glucose). Both these sugars are present in relatively small amounts in aqueous extracts derived from the conversion of starchy materials such as cereal grains into fermentable sugars. For instance, a normal gravity brewers' wort will contain approximately 1.2% by weight maltotriose and approximately 2.0% by weight maltotetrose. Such a brewers' wort is typically derived from a mesh of malted barley and a cereal adjunct, say, corn grits, wheat, milo, sorghum in which the amylase from the malted barley converts the starch of the grains into dextrins and fermentable sugars. Corn steep liquor, often used in the manufacture of distilled alcoholic beverages, derived from the enzymatic conversion of corn is also rich in fermentable sugars, including a small content of maltotriose and maltotetrose. In the fermentation of aqueous extracts like brewers' wort and corn steep liquor which are rich in fermentable sugars, maltotriose and maltotetrose are among the last sugars to be converted into ethanol by the yeast. Consequently, they are utilized at a time when the yeast is under some degree of stress because the supply of other essential nutrients is at a low level. An ideal yeast for fermentation purposes is one that is able to ferment maltotriose and maltotetrose at a good rate and it is, therefore, of interest to brewers and distillers to be able to investigate this property in a large number of yeast strains. However, supplies of pure maltotriose and maltotetrose have been extremely limited. For instance, though there are several commercial sources of pure maltotriose the current price is around $1.00 per milligram and this is obviously a prohibitive price when large scale testing is contemplated.

It is, therefore, the object of the present invention to provide a new means for obtaining maltotriose and maltotetrose which will greatly decrease the cost of these materials.

SUMMARY OF THE INVENTION

According to the present invention maltotriose and maltotetrose are extracted directly from a fermentable source material in which they are present. Suitable source materials are aqueous extracts derived from the enzymatic conversion of starchy materials, such as cereal grains into fermentable sugars which usually contain a small amount of these specific sugars. Illustrative of such source materials are brewers' wort and corn steep liquor. In the following description, reference will be made primarily to brewers' wort as the fermentable source material but it will be understood that other materials such as, for example, as corn steep liquor, could also be used.

Thus, a brewers' wort is first fermented with a yeast strain capable of fermenting sugars other than maltotriose and higher sugars, e.g. *Saccharomyces uvarum* which is a yeast species closely related to the normal ale yeast *Saccharomyces cerevisiae*. This yeast species is well known in the art, being described, for instance, in "The Yeasts" by Lodder and Kreger van Rij, North-Holland Publishing Company, Amsterdam (1952). In a certain respect, *Saccharomyces uvarum* is an unusual yeast species, in that it does not have the genetic capability of fermenting maltotriose, maltotetrose and higher molecular weight sugars due to an enzyme defect. This fermentation with *Saccharomyces uvarum* removes substantially all of the lower molecular weight, i.e. smaller, wort sugars, e.g. glucose, fructose, sucrose and maltose, and also a large percentage of compounds such as amino acids, but does not remove maltotriose, maltotetrose and higher sugars.

After the fermentation has ceased, the yeast is removed leaving a wort liquid containing maltotriose, maltotetrose and other higher sugars. In order to isolate the maltotriose and/or maltotetrose from the other components, the liquid is subjected to gel filtration chromatography and a series of fractions are separated. Fractions containing substantially pure maltotriose or maltotetrose or mixtures of the two are separated and these can be further purified by way of charcoal column chromatography.

DETAILED DESCRIPTION OF THE INVENTION

The fermentation is normally carried out in a stirred fermenter and the fermentation is usually complete within about 4 to 5 days. The fermentation usually establishes a constant gravity of about 4° to 5° P. (i.e. degree Plato) after a period of about 2 days. When the fermentation has been completed, all of the mono- and disaccharides have been metabolised leaving maltotriose, maltotetrose and higher sugars. At this stage, the yeast is removed, e.g. by skimming, filtration or centrifuging, and the remaining wort is stored for further purification. It may conveniently be freeze-dried for storage.

The gel filtration is a well known technique for separation purposes. It is based on the principle that, by means of gel grains which may, for instance, contain a copolymer of a hydroxyl group-containing substance such, for example, as a polysaccharide like dextran, starch, dextrin and polyglucose with a bifunctional substance such, for example, as epichlorohydrin, dichlorohydrin, 1,2,3,4-diepoxybutane, bis-epoxy propyl ether, ethylene glycol-bis-epoxy propyl ether, 1,4 butane-diol-bis-epoxy propyl ether, or a copolymer of an alkylidene-bis-acrylamide with an ethylenically unsaturated substance, a separation is carried out between the different ingredients from a solution thereof into at least two fractions according to molecular sizes, owing to the varying ability of the substances to penetrate into the interior of the gel grains.

A gel filtration process is carried out in two working steps. In the first of these steps the solution of the substances which are to be separated from each other or to be divided into fractions is introduced into a bed of the gel grains. In the second working step liquid is supplied to the bed for the purpose of causing elution to take place.

In the case of the modified dextrans, these are in the form of macromolecules which are cross-linked to give a three-dimensional network of polysaccharide chains. The degree of cross-linking can be varied, thereby varying the swelling properties. The gel grains can swell by imbibing water or other solvents, e.g. dimethylsulphoxide, formamide, glycol and mixtures of water with lower alcohols.

In a bed, e.g. chromatography column, filled with swollen gel grains, small molecules are able to move in the aqueous liquid which is both within and outside the gel. The larger sugar molecules cannot penetrate the gel grains but can only move through the bed in the liquid outside the gel grains. Those molecules which are larger than the largest pores of the swollen gel (i.e. above the exclusion limit) therefore pass through the bed in the liquid phase and are thus eluted first. The smaller molecules penetrate the gel grains and these penetrate to a varying extent depending on their size.

As liquid is continued to be passed through the gel bed, in time the smaller molecules are eluted from the bed in the order of decreasing molecular size. For this reason the liquid eluted from the gel bed is desirably recovered in separate fractions in a repeating time cycle.

By carrying out the gel filtration of the fermented wort in a chromatography column, it is possible to collect a very large number of different effluent fractions. A considerable number of these fractions contain substantially pure maltotriose and/or maltotetrose and these are combined together to make up a total sample of the substantially pure maltotriose and/or maltotetrose depending upon the fractions collected and combined.

Exemplary dextran gel filter bed materials are available from Pharmacia Fine Chemicals Inc., under the registered trade mark "Sephadex." For the purposes of this invention, Sephadex G-15, which has an approximate limit for complete exclusion of about 1500 molecular weight, is particularly useful since maltotriose and maltotetrose have molecular weights of around 500 and 700 respectively.

The substantially pure fractions of maltotriose and maltotetrose can be still further purified by carbon column chromatography to yield a highly pure final product. This can be conveniently done by utilizing a column containing a 50/50 mixture of charcoal and Celite (trade mark for a diatomaceous earth clarifying agent containing silicate and aluminate). In the event a maltotriose-maltotetrose mixture is obtained from the gel chromatography, this may likewise be separated into the two components by carbon column chromatography.

Thus, it will be seen that the present invention provides a very simple and inexpensive technique for obtaining highly pure maltotriose and maltotetrose in substantial quantities by extraction from a fermentable source material such as a brewers' wort.

DESCRIPTION OF ILLUSTRATIVE EMBODIMENTS

The following examples are provided by way of further illustrating, but not limiting the invention.

EXAMPLE 1

Part A

A high gravity (15° P.) hopless ale wort was placed in a 12 liter capacity stirred fermenter and was fermented with *Saccharomyces uvarum*. The fermenter was stirred at about 300 r.p.m. and the fermentation was continued for eight days with continuous aeration by which time all of the mono- and disaccharide had been metabolised leaving maltotriose, maltotetrose and higher sugars. A constant gravity of about 4° to 5° P. was established after 2 days of fermentation. At the conclusion of the fermentation the yeast was removed from the fermentation liquor by centrifuging and the wort remaining was freeze-dried and stored at 4° C. awaiting purification. The yeast so-recovered could be used again in subsequent fermentations.

Part B 25 grams of the freeze-dried wort were reconstituted to 150 mls. with de-ionized water and then applied to a chromatography column containing Sephadex G-15. The column had a diameter of 10 cms. and a height of 70 cms. The material was then eluted, using upward flow, with de-ionized water containing 20 p.p.m. sodium metabisulfite as an antioxidant. The column was jacketed and cooled at 5° C. at all times and the effluent was collected in 25 ml. fractions.

Approximately 200 fractions were collected in tubes and these fractions were monitored by measuring the absorbence at 278 m$\mu$ in order to determine whether successive runs were reproducible. Preliminary chromatograms were run on every tenth tube on silica gel thin layer plates using n-butanol:ethanol:water (5:1:4) (as solvent and spraying with alkaline silver nitrate. It was found that maltotetrose predominated in tubes 1–20, while maltotriose predominated in tubes 20 to 100 together with some contaminating maltotetrose. Individual tubes from runs 1–20 were combined together (Batch A) as were the tubes from runs 20–110 (Batch B). Both batches were freeze-dried. Anthrone analysis of the freeze-dried material of both Batch A and B showed that they contained about 80% carbohydrate by weight. Subsequent chromatographic analysis showed maltotriose to be around 80% of the carbohydrate present in Batch B, and maltotetrose to be around 80% of the carbohydrate present in Batch A.

Part C

In order to further purify the maltotriose, Batch B was subjected to carbon column chromatography. 20 grams of the freeze-dried solids obtained from the Sephadex chromatography of the wort (Batch B) were reconstituted with 50 mls. of 15% aqueous ethanol and then applied to a carbon-Celite column (50:50 mixture). The carbon used was activated charcoal (Darco-G60). The material was eluted, using downward flow, with 15% aqueous ethanol and the effluent collected in 25 ml. fractions.

The actual rotation was read on every fifth fraction and the same fractions were chromatographed and visualised, against standards, on Bakerflex silica gel 1B sheets (20 x 20 cms.) using ethyl acetate:dimethyl formamide:water (60:30:5) as solvent and diphenylamine as the spray reagent.

The first 40 or so fractions, varying slightly from run to run, showed only one spot, that of pure maltotriose, whilst the next 80 to 100 fractions contained both maltotriose and matotetrose in a ratio of about 80:20. The two large portions namely the pure maltotriose and the mixture were bulked separately, the ethanol removed from each, freeze-dried and stored in sealed flasks in a dessicator. The mixture was subjected to further charcoal column chromatography to separate the maltotriose from the maltotetrose.

The maltotriose so-obtained was in the form of a white, fluffy powder. It was highly hygroscopic and, therefore, was stored in a dessicator.

Part D

Batch A containing predominantly maltotetrose was purified in essentially the same manner as Batch B, to yield substantially pure maltotetrose, also as a white, fluffy, hygroscopic powder.

EXAMPLE 2

A test was conducted to confirm the correct identification and purity of the isolated maltotriose by formation of the peracetate derivative.

A suitable reaction vessel was rinsed several times with anhydrous pyridine (stored over potassium hydroxide pellets). Finally, 3 mls., of pyridine were placed in the flask and the liquid was protected from atmospheric moisture as far as was possible from that point onward. Maltotriose (0.100 gram produced as described in Parts A to C of Example 1) was added and the reaction vessel was agitated to bring about dissolution. An inert drying agent (Molecular Sieve, Type 3A, about 0.5 ml. of 1/16 inch pellets) was utilized to remove any residual moisture. Acetic anhydride (3 mls.) completed the reaction mixture which was left undisturbed at room temperature.

After 24 hours, the reaction mixture was decanted leaving the drying agent behind, into a separatory funnel containing ice water (10 mls.). The reaction vessel and the drying agent were rinsed with chloroform which was also decanted into a separatory funnel.

The aqueous layer in the separatory funnel was washed with 15 mls. of chloroform. The resulting chloroform solution was washed with dilute hydrochloric acid (three times with an equal volume of 1 N HCl), water and finally with saturated aqueous sodium bicarbonate until gas evolution ceased. The purified chloroform solution was dried over anhydrous sodium sulfate. It was concentrated on a rotary evaporator and finally at high vacuum. The resulting syrup was utilized for chromatographic analysis.

The chromatographic analysis was conducted on Bakerflex silica gel sheets (20 x 20 cms.) using benzene: methanol as solvent and 50% $H_2SO_4$ as the visualising spray reagent. Only one spot resulted on spraying with the 50% $H_2SO_4$ and this had the same $R_f$ value as authentic maltotriose peracetate.

EXAMPLE 3

As a further confirmation test, trimethyl-silyl derivatives were prepared by adding 1 ml. of Tri-Sil "Z" (trade mark of Pierce Chemical Company) to 10 mgs. of maltotriose produced as described in Parts A–C of Example 1. This was then analyzed by gas liquid chromatography and the results obtained were reproduced graphically in the usual way. Except for some extraneous solvent peaks, only one substance appeared to be present in the freeze-dried maltotriose sample.

EXAMPLE 4

Yet another confirmatory test was conducted by running descending chromatograms on Whatman No. 1 chromatographic paper of a maltotriose sample of Example 1, Parts A–C, against standard samples of maltotriose. Butanol:pyridine:acetic acid:water (6:4:1:3) was used as the solvent and the chromatograms were sprayed with alkaline silver nitrate solution. The maltotriose sample gave only one spot which had the same $R_f$ value as an authentic maltotriose marker.

All of the above tests confirm that the maltotriose obtained according to the procedure of Parts A to C of Example 1 is a substantially pure substance that can be used with confidence as an analytical tool in fermentation work and for all purposes in which maltotriose is useful. Similar tests to those of Examples 2–4 confirm the authenticity and purity of the maltotriose produced by the procedure of Parts A, B and D of Example 1.

What is claimed is:

1. A process for producing a material selected from the group consisting of maltotriose, maltotetrose and mixtures thereof which comprises isolating the material from a starch hydrolyzate source material in which it is present by the following steps:
   (a) fermenting the starch hydrolyzate source material with a yeast strain capable of fermenting sugars other than maltotriose, maltotetrose and higher molecular weight sugars;
   (b) separating the yeast from the remaining starch hydrolyzate source material containing maltotriose and maltotetrose;
   (c) subjecting the remaining starch hydrolyzate source material to gel filtration chromatography; and
   (d) collecting fractions from the gel filtration comprising predominantly maltotriose or maltotetrose or mixtures of both.

2. A process as claimed in claim 1, in which the yeast strain is *Saccharomyces uvarum*.

3. A process as claimed in claim 1, in which the starch hydrolyzate source material is a brewers' wort.

4. A process as claimed in claim 1, in which the gel filtration is conducted using a modified dextran, in which dextran macromolecules are cross-linked with bifunctional substances to give a three-dimensional network of polysaccharide chains.

5. A process as claimed in claim 1, in which the material obtained from the gel filtration chromatography is subjected to carbon column chromatography.

6. A process as claimed in claim 5, in which the carbon column comprises a mixture of charcoal and a diatomaceous earth clarifying agent.

References Cited
UNITED STATES PATENTS

| | | | |
|---|---|---|---|
| 3,627,636 | 12/1971 | Joffe et al. | 195—11 |
| 2,377,653 | 6/1945 | Sattler et al. | 195—11 |

OTHER REFERENCES

Lodder et al.: The Yeasts, North Holland Publishing Company, 190, pp. 703–705.

Neufeld et al.: Methods in Enzymology, Academic Press, 1966, vol. 8, pp. 30–31.

Jakoby et al.: Methods in Enzymology, Academic Press, 1971, vol. 22, pp. 287–289, 315–318.

A. LOUIS MONACELL, Primary Examiner

T. G. WISEMAN, Assistant Examiner

U.S. Cl. X.R.

195—31 R